United States Patent Office 3,340,291
Patented Sept. 5, 1967

3,340,291
PRODUCTION OF UNSATURATED
ALIPHATIC NITRILES
John Lynn Barclay, Tadworth, Surrey, and Edward James Gasson and David James Hadley, Epsom Downs, Surrey, England, assignors to The Distillers Company Limited, Edinburgh, Scotland, a British company
No Drawing. Filed Mar. 31, 1964, Ser. No. 356,078
Claims priority, application Great Britain, Apr. 30, 1963, 16,890/63
4 Claims. (Cl. 260—465.3)

The present invention relates to the production of unsaturated aliphatic nitriles, and in particular to the production of acrylonitrile and methacrylonitrile.

According to the present invention, the process for the production of acrylonitrile or methacrylonitrile comprises reacting at a elevated temperature in the vapour phase propylene or isobutene with oxygen and ammonia over an oxide composition containing antimony together with polyvalent metals chromium, cobalt, copper, nickel and titanium as oxidation catalyst.

The oxide composition may be regarded either as mixtures of antimony oxides with an oxide or oxides of the polyvalent metals or as oxygen-containing compounds of antimony and a polyvalent metal; under the reaction conditions the catalyst may contain either or both forms. The catalysts may be prepared, for instance, by intimately mixing antimony oxide or hydrated oxide with the other metal oxide or hydroxide. Alternatively the catalyst may be prepared by precipitation, for instance by adding ammonia or an amine to an aqueous solution of an antimony salt and an aqueous solution or suspension of a suitable salt of the polyvalent metal, and recovering the precipitate.

The catalyst activity of the composition is frequently improved by a heat treatment, for instance at a temperature between 550° and 1100° C. in a molecular oxygen containing gas.

After this heat treatment, the composition may be further activated, if desired, by heating in aqueous nitric acid at about 100° C. The time of heating is not critical, and may, for example, vary between about ten minutes and six hours. A period of about three hours is preferred. The composition is then washed with water and dried e.g. at about 110° C. prior to use.

The oxide composition is used as a catalyst, if desired, deposited on supports such as silica, pumice or silicon carbide.

The reaction of propylene or isobutene with oxygen and ammonia over the catalyst may be carried out in any suitable manner, for instance as a fixed bed process in which the catalyst is used in the form of granules or pellets, or as a fluidised bed process, or as a moving bed process.

The proportion of olefin in the feed to the reaction may vary within fairly wide limits, for example between 1 and 20% by volume of the feed, and suitably between about 2 and 10% by volume. It is preferred to use between 4 and 6% by volume of the olefin in the feed. The preferred olefin is propylene.

The concentration of oxygen in the feed may also vary within moderately wide limits, for example between 1 and 20% by volume and preferably between 2 and 15% by volume. The oxygen may be diluted with inert gases, and may be, for example, supplied as air.

The reaction is suitably carried out in the presence, as diluent, of a gas which is substantially inert under the conditions of reaction, for example, nitrogen, propane, butane, isobutane, carbon dioxide and steam. It is preferred to carry out the reaction in the presence of steam or mixtures of steam and nitrogen. The concentration of the steam may vary within wide limits, for instance between 20 and 60% by volume of the feed.

The concentration of ammonia may also vary within moderately wide limits, for instance between 2 and 10% by volume of the feed. If the maximum yield of acrylonitrile or propylene is required it is desirable to use an excess of ammonia over propylene, although equimolar quantities or an excess of propylene may also be fed. The preferred concentration of ammonia is about 6% by volume of the feed where this contains 5% of propylene.

The reaction is carried out at an elevated temperature, preferably between 300 and 550° C.

The contact time, defined as the volume of catalyst divided by the flow of gas per second calculated at room temperature and pressure, may be, for example, in the range 1–30 seconds.

The reaction may be carried out at atmospheric pressure, or at super- or sub-atmospheric pressures. It is preferred to operate at a pressure of 1 to 5 atmospheres absolute.

The unsaturated nitrile may be recovered from the reaction products in any suitable manner, for example by extraction with water, preferably at an acid pH, followed by fractional distillation. In one method the hot reaction gases are contacted firstly with a cold dilute aqueous acid solution which neutralises excess ammonia and extracts some of the nitrile, and secondly with cold water to extract the remainder of the nitrile; the nitrile is subsequently recovered from the extracts by fractional distillation.

The process of the invention is further illustrated with reference to the following examples.

Example 1

A solution of copper chloride ($CuCl_2.2H_2O$), 56.8 parts by weight in water, 100 parts by weight, was added to antimony pentachloride, 199.1 parts by weight, dissolved in concentrated hydrochloric acid (S.G.=1.18), 236 parts by weight. The solution was diluted with water, 100 parts by weight, and pH adjusted to 6 by the slow addition of 8 N aqueous ammonia solution. The precipitate was filtered off, washed by re-suspension in water, 1500 parts by weight, filtered, and dried at 110° C. for 16 hours. The dried powder was formed into tablets and heated at 450° C. for 2 hours in a stream of air containing 10% by volume of ammonia.

A mixture of, by volume 5% propylene, 6% ammonia, 55% of air and 34% of steam was passed over a bed of this catalyst in a reactor at 452° C. The contact time was 4 seconds.

The yield of acrylonitrile based on the propylene fed was 25%. 25% of the propylene was recovered.

Example 2

Antimony pentachloride, 199.5 parts by weight, was added dropwise to a stirred solution of cobalt chloride ($CoCl_2.6H_2O$), 79.3 parts by weight, in water, 1000 parts by weight. The pH of the suspension was adjusted to 7 by the addition of 8 N aqueous ammonia solution. The precipitate was filtered off, washed three times by re-suspension in water, 2000 parts by weight, and dried at 110° C. for 16 hours. The dried powder was formed into tablets and heated for 6 hours at 440° C. in a stream of air containing 10% by volume of ammonia. The pellets were subsequently heated to 700° C. for 16 hours.

A mixture of, by volume, 5% propylene, 6% ammonia, 55% air and 34% steam, was passed over a bed of this catalyst in a reactor at 480° C. The contact time was 4 seconds.

The yield of acrylonitrile based on the propylene fed to the reactor was 53%. 15% of the propylene was recovered.

Example 3

A solution of nickel chloride (NiCl$_2$.6H$_2$O) 79.2 parts by weight, in water 200 parts by weight, was added to antimony pentachloride, 199.2 parts by weight, dissolved in concentrated hydrochloric acid (S.G.=1.18), 236 parts by weight. The solution was diluted with water, 200 parts by weight and the pH adjusted to 6 by the slow addition of 8 N aqueous ammonia solution. The precipitate was filtered off, washed three times, by re-suspension in water, 1500 parts by weight, and dried at 110° C. for 16 hours. The dried powder was formed into tablets and heated at 450° C. for 2 hours in a stream of air containing 10% by volume of ammonia. The pellets were subsequently heated at 700° C. for 16 hours.

A mixture of, by volume, 5% propylene, 6% ammonia, 55% air and 34% steam was passed over a bed of this catalyst, in a reactor at 480° C. The contact time was 4 seconds.

The yield of acrylonitrile based on the propylene fed to the reactor was 50%. 18% of the propylene was recovered.

Example 4

Antimony powder, 36.5 parts by weight, was added to nitric acid (S.G.=1.42), 214 parts by weight; the temperature of the stirred mixture being between 93 and 106° C. during the addition. The suspension was heated at its boiling point for a further 15 minutes, cooled to below 40° C. and filtered. The filter cake was washed by resuspension in distilled water, 500 parts by weight, at room temperature for 15 minutes, filtered, boiled in distilled water, 500 parts by weight, for one hour, cooled to below 40° C. and filtered. The filter cake was finally washed by resuspension in distilled water, 500 parts by weight, at room temperature for 15 minutes and filtered.

A solution of tetra-n-propyl orthotitanate,

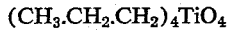
(CH$_3$.CH$_2$.CH$_2$)$_4$TiO$_4$ 426.3 parts by weight, in benzene, 1320 parts by weight, was added slowly to a stirred suspension of the antimony oxides in distilled water, 2000 parts by weight. During the addition a further 1000 parts by weight of distilled water were added to the mixture. After stirring for one hour, the precipitate was filtered off, evaporated to dryness and finally dried at 110° C. for 16 hours. The mixture was ground to less than 30 mesh (B.S.S.) mixed with 1% by weight graphite and pelleted. The pellets were heated in a stream of air; the furnace temperature being raised from 300° C. to 600° C. at 22° C. per hour and kept at 600° C. for 16 hours.

A gaseous mixture of by volume 5.0% propylene, 6.0% ammonia, 55.0% air and 34.0% steam was passed over a bed of this catalyst in an isothermal reactor maintained at 520° C. The contact time was 4 seconds.

The yield of acrylonitrile based on propylene fed was 53%.

Example 5

Chromic chloride (CrCl$_3$.6H$_2$O), 133.2 parts by weight, was added slowly to distilled water, 3000 parts by weight. Antimony pentachloride, 301.3 parts by weight, was then added dropwise to the stirred mixture followed by the addition of ammonia solution (S.G.=.880) until the pH reached 8.2. The suspension was stirred for one hour, the precipitate filtered off and washed twice by resuspension in distilled water: 3000 parts by weight, for 1 hour periods at room temperature. The filter cake was dried at 110° C. for 16 hours, ground to less than 30 mesh (B.S.S.), mixed with 1% by weight graphite and pelleted.

The pellets were heated in a stream of air, the furnace temperature being raised from 250° C. to 700° C. at 22° C. per hour and kept at 700° C. for 16 hours.

A gaseous mixture of by volume 5.0% propylene, 6.0% ammonia, 55.0% air and 34.0% steam was passed over a bed of this catalyst in an isothermal reactor maintained at 500° C. The contact time was 4 seconds.

The yield of acrylonitrile based on propylene fed was 47.5%.

We claim:

1. The process for the production of acrylonitrile or methacrylonitrile which comprises reacting at a temperature between 300° and 550° C. in the vapour phase propylene for the production of acrylonitrile or isobutene for the production of methacrylonitrile with oxygen and ammonia over an oxide composition wherein the oxide composition is prepared by intimate mixture of antimony oxide with a second material consisting essentially of the oxide of chromium, cobalt, copper, nickel or titanium and wherein said oxide composition is treated at 550°–1100° C. in a molecular oxygen containing gas.

2. The process of claim 1 wherein after being heated in the molecular oxygen containing gas the oxide composition is heated in aqueous nitric acid at about 100° C., washed with water, and subsequently dried.

3. The process of claim 2 wherein the composition is heated in nitric acid for a period between 10 minutes and 6 hours.

4. The process of claim 1 wherein the catalyst is deposited on alumina, silica, pumice or carborundum as a support.

References Cited

UNITED STATES PATENTS

| | | | |
|---|---|---|---|
| 3,009,943 | 11/1961 | Hadley et al. | 260—465.3 |
| 3,135,783 | 6/1964 | Sennewald et al. | 260—465.3 |
| 3,179,694 | 4/1965 | Van Eygen et al. | 260—465.3 |
| 3,200,081 | 8/1965 | Callahan et al. | 260—465.3 X |
| 3,226,421 | 12/1965 | Giordano et al. | 260—465.3 |

JOSEPH P. BRUST, *Primary Examiner.*

CHARLES B. PARKER, *Examiner.*